(12) United States Patent
Hienz et al.

(10) Patent No.: US 11,148,651 B2
(45) Date of Patent: Oct. 19, 2021

(54) MULTIPLE-CIRCUIT, HYDRAULICALLY OPEN BRAKE SYSTEM, IN PARTICULAR FOR A HIGHLY AUTOMATED OR AUTONOMOUS VEHICLE

(71) Applicant: Robert Bosch GmbH, Stuttgart (DE)

(72) Inventors: Bernd Hienz, Ludwigsburg (DE); Daniel Brenndoerfer, Ludwigsburg (DE); Dirk Drotleff, Oberstenfeld-Gronau (DE); Ralf Kleemann, Benningen Am Neckar (DE); Thomas Friedrich, Ingersheim (DE)

(73) Assignee: Robert Bosch GmbH, Stuttgart (DE)

( * ) Notice: Subject to any disclaimer, the term of this patent is extended or adjusted under 35 U.S.C. 154(b) by 140 days.

(21) Appl. No.: 16/381,859

(22) Filed: Apr. 11, 2019

(65) Prior Publication Data

US 2019/0322261 A1    Oct. 24, 2019

(30) Foreign Application Priority Data

Apr. 20, 2018 (DE) ..................... 10 2018 206 079.7

(51) Int. Cl.
*B60T 13/58* (2006.01)
*B60T 13/16* (2006.01)
(Continued)

(52) U.S. Cl.
CPC ................ *B60T 13/58* (2013.01); *B60T 7/12* (2013.01); *B60T 8/17* (2013.01); *B60T 13/16* (2013.01);
(Continued)

(58) Field of Classification Search
CPC .......... B60T 13/58; B60T 13/16; B60T 13/48; B60T 13/686; B60T 2270/403; B60T 7/12; B60T 2270/402; B60T 8/17; B60T 8/885

See application file for complete search history.

(56) References Cited

U.S. PATENT DOCUMENTS

| | | | |
|---|---|---|---|
| 2014/0152085 A1* | 6/2014 | Biller | B60T 8/441 303/10 |
| 2014/0203626 A1* | 7/2014 | Biller | B60T 8/17 303/10 |

(Continued)

FOREIGN PATENT DOCUMENTS

| | | |
|---|---|---|
| DE | 10 2009 001 135 A1 | 8/2010 |
| DE | 10 2013 227 065 A1 | 6/2015 |

(Continued)

*Primary Examiner* — Pamela Rodriguez
(74) *Attorney, Agent, or Firm* — Maginot, Moore & Beck LLP (57) ABSTRACT

A multiple-circuit, hydraulically open brake has two single-circuit pressure generators hydraulically connected in parallel between at least one fluid container and at least two wheel brakes and a modulation unit for individual brake pressure modulation in the at least two wheel brakes. A first pressure generator is assigned to a main system which has a first energy supply and a first evaluation and control unit, and a second single-circuit pressure generator is assigned to a secondary system, which has a second energy supply which is independent of the first energy supply, and a second evaluation and control unit. The second evaluation and control unit controls the second pressure generator. Components of the modulation unit are assigned to the main system so that the modulation unit and the first pressure generator are controlled by the first evaluation and control unit and supplied with energy by the first energy supply.

20 Claims, 4 Drawing Sheets

(51) Int. Cl.
  *B60T 13/68* (2006.01)
  *B60T 7/12* (2006.01)
  *B60T 8/17* (2006.01)

(52) U.S. Cl.
  CPC ....... *B60T 13/686* (2013.01); *B60T 2270/402* (2013.01); *B60T 2270/403* (2013.01)

(56) References Cited

U.S. PATENT DOCUMENTS

| | | | | |
|---|---|---|---|---|
| 2015/0175146 | A1* | 6/2015 | Quirant | B60T 8/4081 303/14 |
| 2017/0072920 | A1* | 3/2017 | Besier | B60T 8/4081 |
| 2017/0282877 | A1* | 10/2017 | Besier | B60T 17/002 |
| 2020/0406878 | A1* | 12/2020 | Friedrich | B60T 15/028 |
| 2021/0039616 | A1* | 2/2021 | Friedrich | B60T 8/885 |

FOREIGN PATENT DOCUMENTS

WO  WO-2019/201619 A1 * 10/2019
WO  WO-2019/223924 A1 * 11/2019

* cited by examiner

Fig. 4 though in an autonomous driving function, there is no longer a driver
MULTIPLE-CIRCUIT, HYDRAULICALLY OPEN BRAKE SYSTEM, IN PARTICULAR FOR A HIGHLY AUTOMATED OR AUTONOMOUS VEHICLE This application claims priority under 35 U.S.C. § 119 to patent application no. DE 10 2018 206 079.7, filed on Apr. 20, 2018 in Germany, the disclosure of which is incorporated herein by reference in its entirety.

The disclosure proceeds from a multiple-circuit, hydraulically open brake system, in particular for a highly automated or autonomous vehicle. The present disclosure also relates to an operating method for a multiple-circuit, hydraulically open brake system of this type.

BACKGROUND

Vehicles having at least one highly automated or autonomous driving function, which can take over an actual driving task at least in part, are known from the prior art. As a result, the vehicles can drive in a highly automated or autonomous manner, in which the vehicles autonomously detect for example the course of the road, other traffic participants or obstacles and calculate the corresponding control commands in the vehicle and transmit said commands to the actuators in the vehicle, by which the driving course of the vehicle is correctly influenced. In the case of a highly automated or autonomous vehicle of this type, the driver is generally not involved in the driving process. Nevertheless, measures and means are provided which allow the driver to intervene in the driving process themselves at any time.

In addition, brake systems for vehicles which are designed for control by hydraulic intervention by a vehicle driver are known from the prior art. As a result, when the brake system fails, it is ensured that the driver can still apply sufficient braking force to the wheels of the vehicle by actuating the brake pedal. This design substantially influences the topology of today's brake systems. Thus, for example the size of a tandem master brake cylinder can be explained by the maintenance of good performance in the fall-back level. In addition, the brake systems can be designed as what are known as coupled brake systems or power-assisted brake systems. However, these systems are also produced in such a way that hydraulic intervention by the driver is still provided as a fall-back level. Power-assisted brake systems are not suitable for highly automated or autonomous vehicles, since in said vehicles, during an autonomous driving function, there is no longer a driver there as backup, and the brake system must build up the braking energy completely autonomously.

DE 10 2013 227 065 A1 discloses a hydraulic brake system and a method for operating such a brake system. The hydraulic brake system comprises a master brake cylinder, at least one wheel-brake cylinder, a first brake pressure generator and a second brake pressure generator. In this case, the master brake cylinder can be hydraulically connected to the at least one wheel-brake cylinder by means of the second brake pressure generator. In this case, the first brake pressure generator and the second brake pressure generator can be hydraulically connected in parallel or in series between the master brake cylinder and the at least one wheel-brake cylinder.

DE 10 2009 001 135 A1 discloses a method for actuating a hydraulic vehicle brake system. The vehicle brake system comprises an electromechanical brake booster and a wheel slip control. In this case, the vehicle brake system is actuated by the brake booster in situations in which a brake pedal is not actuated, for example to limit a vehicle speed or control a distance from a vehicle driving ahead or when parking.

SUMMARY

The multiple-circuit, hydraulically open brake system, in particular for a highly automated or autonomous vehicle, having the features of disclosed herein and the corresponding operating method for a multiple-circuit, hydraulically open brake system of this type having the features disclosed herein have the advantage that a simple, robust and cost-effective brake-system architecture can be provided without mechanical and/or hydraulic intervention by the driver, which architecture allows sufficient brake performance even in the event of a fault by means of a suitable redundancy concept.

Embodiments of the disclosure have fewer components than known brake systems, since fewer valves, no pedal travel simulator and no mechanism are required to generate, amplify and transmit the driver pressure, and therefore there are lower brake system costs. In addition, there are lower system costs, since there is only one hydraulic connection on the wheel brakes, and no alternative solutions with two connections in the brake caliper which act on different pistons are required.

In addition, there are lower integration costs for the vehicle manufacturer, since the embodiments of the disclosure allow a simple installation, in particular for right-hand and left-hand drive, as a result of the electrical control without mechanical and/or hydraulic intervention by the driver, and free up installation space on the bulkhead between the engine compartment and the vehicle interior. Since none of the brake system actuators has to be mounted on the bulkhead, there can also be advantages in terms of NVH (NVH: noise, vibration, harshness). As a result of the smaller number of components, this system also has a lower weight and volume in comparison with known brake systems.

As a result of the division into a main system and a secondary system, a modular concept with two assemblies can be implemented in a simple manner.

Embodiments of the present disclosure provide a multiple-circuit, hydraulically open brake system, in particular for a highly automated or autonomous vehicle, comprising at least two wheel brakes, which are each assigned to a brake circuit having a pressure-relief path, two single-circuit pressure generators, which are hydraulically connected in parallel between at least one fluid container and the at least two wheel brakes, and a modulation unit for the hydraulic connection of the single-circuit pressure generator to the at least two wheel brakes and for the individual brake pressure modulation in the at least two wheel brakes. In this case, a first single-circuit pressure generator is assigned to a main system which has a first energy supply and a first evaluation and control unit, and can be connected by means of a first shut-off valve to at least one wheel brake of a first brake circuit and by means of a second shut-off valve to at least one wheel brake of a second brake circuit. A second single-circuit pressure generator is assigned to a secondary system which has a second energy supply which is independent of the first energy supply and a second evaluation and control unit, and can be connected by means of a third shut-off valve to at least one wheel brake of the first brake circuit and by means of a fourth shut-off valve to at least one wheel brake of the second brake circuit. The second evaluation and control unit controls the second single-circuit pressure generator, components of the modulation unit being assigned to the main system for the individual brake pressure modulation so that said components of the modulation unit and the first single-circuit pressure generator are controlled by the first evaluation and control unit and are supplied with energy by the first energy supply.

In addition, an operating method for a multiple-circuit, hydraulically open brake system of this type, in particular for a highly automated or autonomous vehicle, is proposed. In normal operation, by means of the first single-circuit pressure generator, the main system increases or reduces or maintains the pressure in the brake circuits and, by means of the modulation unit, carries out the individual brake pressure modulation in the at least two wheel brakes. When the main system fails, by means of the second single-circuit pressure generator, the secondary system increases or reduces or maintains the pressure in the brake circuits, and the individual brake pressure modulation in the at least two wheel brakes is omitted.

A hydraulically open brake system is understood to mean a brake system in which, during an individual brake pressure modulation, brake fluid released from the wheel brakes can be returned to the fluid container via a pressure-relief path.

By means of the individual brake pressure modulation in the individual wheel brakes, in an advantageous manner, various control functions can be implemented, such as an anti-lock braking system ABS, an anti-slip regulation ASR, or an electronic stability program ESP for the longitudinal and transverse stabilization of the vehicle. Since these control functions are known per se, these will not be described in greater detail here.

In the present case, the evaluation and control unit can be understood to mean an electrical device such as a control device which processes and evaluates detected sensor signals. The evaluation and control unit can comprise at least one interface which can be designed as hardware and/or software. When designed as hardware, the interfaces can be for example part of what is known as a system ASIC, which contains a wide variety of functions of the evaluation and control unit. However, it is also possible for the interfaces to be separate, integrated switching circuits or to consist at least in part of discrete components. When designed as software, the interfaces can be software modules which are for example on a microcontroller in addition to other software modules. A computer program product having program code which is stored on a machine-readable carrier such as a semiconductor memory, a hard disk storage unit or an optical memory and is used to carry out the evaluation when the program is executed by the evaluation and control unit is also advantageous.

To detect the sensor signals, sensor units are provided, which in the present case are understood to mean assemblies which comprise at least one sensor element which directly or indirectly detects a physical variable or a change in a physical variable and preferably converts said variable into an electrical sensor signal. This can take place for example by transmitting and/or receiving sound waves and/or electromagnetic waves and/or by means of a magnetic field or changing a magnetic field and/or receiving satellite signals, for example a GPS signal. A sensor unit of this type can comprise for example acceleration sensor elements, which detect acceleration-related information of the vehicle, and/or sensor elements which detect objects and/or obstacles and/or other crash-related vehicle environment data and provide said data for evaluation. Sensor elements of this type can be based for example on video and/or radar and/or LIDAR and/or PMD and/or ultrasound technologies. In addition, signals and information from existing ABS sensors and the variables derived in the control device provided for this purpose can also be evaluated. Based on the acceleration-related information and/or variables determined therefrom, for example a vehicle movement and a vehicle location in the three-dimensional space can be estimated and evaluated for accident detection.

To determine the position of the vehicle, for example global navigation satellite systems GNSS can be used. In this case, GNSS is used as an umbrella term for the use of existing and future global satellite systems such as NAVSTAR GPS (global positioning system) from the United States of America, GLONASS (global navigation satellite system) from the Russian Federation, Galileo from the European Union, Beidou from the People's Republic of China, etc.

A highly automated or autonomous vehicle is understood to mean a vehicle which has at least one highly automated or autonomous driving function which can take over an actual driving task at least in part. By means of this at least one highly automated or autonomous driving function, the vehicle autonomously detects for example the course of the road, other traffic participants or obstacles and calculates the corresponding control commands which are transmitted to the actuators in the vehicle, by which the driving course of the vehicle is correctly influenced. In the case of a highly automated or autonomous vehicle of this type, the driver is generally not involved in the driving process. Nevertheless, measures and means are provided, for example in the form of electrical or electronic actuating elements, which allow the driver to intervene in the driving process themselves at any time. The braking intention produced by the driver by means of the actuating elements is then transmitted to the main system and/or the secondary system by means of electrical signals. However, there is no mechanical and/or hydraulic intervention by the driver.

For trajectory planning, the at least one driving function evaluates vehicle data detected by internal sensor units, such as ABS interventions, steering angle, position, direction, speed, acceleration etc. and/or vehicle environment data, which are detected for example by means of camera, radar, LIDAR and/or ultrasound sensor units, and accordingly controls the evaluation and control units of the main system and the secondary system in order to generate a desired braking pressure and/or implement stabilization processes in the longitudinal and/or transverse direction by means of individual brake pressure modulation in the wheel brakes.

By means of the measures and developments disclosed herein, advantageous improvements of the multiple-circuit, hydraulically open brake system, in particular for a highly automated or autonomous vehicle, and of the operating method for a multiple-circuit, hydraulically open brake system, in particular for a highly automated or autonomous vehicle, are possible.

It is particularly advantageous that the shut-off valves can be controlled by the first evaluation and control unit and/or by the second evaluation and control unit in such a way that, when one of the two single-circuit pressure generators is activated, a hydraulic fluid is not conducted through the other of the two single-circuit pressure generators. Thus for example the first shut-off valve and the second shut-off valve can each be designed as magnetic valves which are closed when de-energized, and the third shut-off valve and the fourth shut-off valve can be designed as magnetic valves which are open when de-energized, the first evaluation and control unit controlling the shut-off valves. Thus, in this embodiment, the shut-off valves belong to the main system and are supplied with energy by the first energy supply unit.

By designing the first shut-off valve and the second shut-off valve to be closed when de-energized, the first single-circuit pressure generator is hydraulically separated from the wheel brakes. By designing the third shut-off valve and the fourth shut-off valve to be open when de-energized, the second single-circuit pressure generator is hydraulically connected to the wheel brakes. Therefore, in normal operation in which the first single-circuit pressure generator generates the pressure for the wheel brakes, control of the shut-off valves is required to hydraulically connect the first single-circuit pressure generator to the wheel brakes and to hydraulically separate the second single-circuit pressure generator from the wheel brakes. In addition, the wheel brakes are connected to the at least one fluid container by means of the second single-circuit pressure generator in order to be able to compensate, in the de-energized or passive state, for a temperature-dependent expansion of the brake fluid by what is known as "respiration". Therefore, in this context, "respiration by the secondary system" is mentioned.

Alternatively, the first shut-off valve and the second shut-off valve can each be designed as magnetic valves which are open when de-energized, and the third shut-off valve and the fourth shut-off valve can be designed as magnetic valves which are closed when de-energized, the second evaluation and control unit controlling the shut-off valves. Thus, in this embodiment, the shut-off valves belong to the secondary system and are supplied with energy by the second energy supply unit. By designing the first shut-off valve and the second shut-off valve to be open when de-energized, the first single-circuit pressure generator is hydraulically connected to the wheel brakes. By designing the third shut-off valve and the fourth shut-off valve to be closed when de-energized, the second single-circuit pressure generator is hydraulically separated from the wheel brakes. Therefore, in normal operation in which the first single-circuit pressure generator generates the pressure for the wheel brakes, no control of the shut-off valves is required to hydraulically connect the first single-circuit pressure generator to the wheel brakes and to hydraulically separate the second single-circuit pressure generator from the wheel brakes. In addition, the wheel brakes are connected to the at least one fluid container by means of the first single-circuit pressure generator in order to be able to compensate, in the de-energized or passive state, for a temperature-dependent expansion of the brake fluid by what is known as "respiration". Therefore, in this context, "respiration by the main system" is mentioned.

As another alternative, the first shut-off valve and the fourth shut-off valve can each be designed as magnetic valves which are open when de-energized, and the second shut-off valve and the third shut-off valve can be designed as magnetic valves which are closed when de-energized, the first evaluation and control unit controlling the second shut-off valve and the fourth shut-off valve, and the second evaluation and control unit controlling the first shut-off valve and the third shut-off valve. Thus, in this embodiment, the second shut-off valve and the fourth shut-off valve belong to the main system and are supplied with energy by the first energy supply unit, and, in this embodiment, the first shut-off valve and the third shut-off valve belong to the secondary system and are supplied with energy by the second energy supply unit. By designing the first shut-off valve to be open when de-energized, the first single-circuit pressure generator is hydraulically connected to the wheel brakes of the first brake circuit. By designing the second shut-off valve to be closed when de-energized, the first single-circuit pressure generator is hydraulically separated from the wheel brakes of the second brake circuit. By designing the fourth shut-off valve to be open when de-energized, the second single-circuit pressure generator is hydraulically connected to the wheel brakes of the second brake circuit. By designing the third shut-off valve to be closed when de-energized, the second single-circuit pressure generator is hydraulically separated from the wheel brakes of the first brake circuit. Therefore, in normal operation in which the first pressure generator generates the pressure for the wheel brakes, control of the second and fourth shut-off valves is required to hydraulically connect the first pressure generator to the wheel brakes of the first and second brake circuits and to hydraulically separate the second pressure generator from the wheel brakes of the first and second brake circuits. In addition, the wheel brakes of the first brake circuit are connected to the at least one fluid container by means of the first single-circuit pressure generator, and the wheel brakes of the second brake circuit are connected to the at least one fluid container by means of the second single-circuit pressure generator in order to be able to compensate for a temperature-dependent expansion of the brake fluid in the de-energized or passive state by what is known as "respiration". Therefore, in this context, "respiration by the main system and by the secondary system" is mentioned.

In another advantageous embodiment of the brake system, the main system and the secondary system can comprise a common fluid container. Alternatively, a first fluid container having at least one fluid chamber can be assigned to the main system, and a second fluid container having at least one fluid chamber can be assigned to the secondary system.

In another advantageous embodiment of the brake system, the first single-circuit pressure generator can be designed as a plunger system or as a pump system. As a result of the open architecture, the first single-circuit pressure generator designed as a plunger system is capable of reloading or monitoring fluid. In this case, the shut-off valves advantageously prevent the plunger system from suctioning brake fluid out of the wheel brakes during the reloading process. In addition, in each case one suction line having a non-return valve can be provided for the first plunger system in each brake circuit, which line can additionally hydraulically connect the first plunger system to the fluid container. As a result, the reloading process can be carried out more quickly in particular at low temperatures. Analogously, the second single-circuit pressure generator can be designed as a plunger system or as a pump system. In this case, a plunger system of this type can comprise a piston-cylinder unit having a piston and a chamber and a drive, the drive moving the piston against the force of a return spring for pressure adjustment in the chamber. A pump system of this type can comprise a pump and a drive which can drive the pump.

By designing the first single-circuit pressure generator as a plunger system, good NVH performance is achieved in the whole system, and more simple and/or more precise monitoring and improved control is achieved. This makes it possible for position as well as volume and pressure-build-up information to be detected in the main system more simply and in particular more precisely in comparison with other concepts (pump system). By designing the second single-circuit pressure generator as a plunger system, very good NVH performance is achieved both in normal operation and when the main system fails. By designing the second pressure generator as a pump system, lower costs, a smaller installation space and a lower weight are achieved in comparison with other concepts (plunger system).

The modulation unit comprises, for each wheel brake, for the individual brake pressure modulation, in each case one inlet valve and in each case one outlet valve. The inlet valves can be designed for example as controllable magnetic valves which are open when de-energized. The outlet valves can be designed for example as electromagnetic switch valves which are closed when de-energized, or as adjustable magnetic valves which are closed when de-energized. By designing the modulation unit in this manner, it is advantageously possible to use inlet valves and/or outlet valves from already known ESP systems and, by means of already existing economies of scale (ESP is produced by the millions), to achieve very low overall system costs. In addition, a first wheel brake and a second wheel brake can be assigned to the first brake circuit, and a third wheel brake and a fourth wheel brake can be assigned to the second brake circuit. In this case, both an X-distribution, that is to say the wheel brake of the left front wheel and the wheel brake of the right rear wheel are assigned to the first brake circuit, and the wheel brake of the right front wheel and the wheel brake of the left rear wheel are assigned to the second brake circuit, and an II-distribution of the brake circuits are possible, that is to say the wheel brake of the left front wheel and the wheel brake of the right front wheel are assigned to the first brake circuit, and the wheel brake of the left rear wheel and the wheel brake of the right rear wheel are assigned to the second brake circuit.

In another advantageous embodiment of the brake system, during an individual brake pressure modulation in the at least one wheel brake, brake fluid released from the at least one wheel brake can be returned via the at least one pressure-relief path either to the first fluid container or to the second fluid container. As a result of a defined return of this type to only one fluid container, said container has defined fill levels. When returning to the two fluid containers, a fill-level compensation by additional hardware and monitoring of the fill levels would additionally be required, which would cause higher costs.

In another advantageous embodiment of the brake system, the first pressure generator, the second pressure generator and the modulation unit can be arranged in a common hydraulic block. In this case, the shut-off valves can also be arranged in this common hydraulic block. Alternatively, the first pressure generator and the modulation unit can be arranged in a first hydraulic block, and the second pressure generator can be arranged in a second hydraulic block. In this embodiment, the shut-off valves can be distributed to the two hydraulic blocks according to assignment or arranged together in one of the two hydraulic blocks.

In an advantageous embodiment of the operating method, in normal operation, the first shut-off valve and the second shut-off valve can be transferred into the open state, and the third shut-off valve and the fourth shut-off valve can be transferred into the closed state, the drive of the first single-circuit pressure generator being controlled accordingly to increase pressure or to reduce pressure or to maintain pressure in the brake circuits.

In another advantageous embodiment of the operating method, in normal operation, to individually increase pressure in an assigned wheel brake, the associated inlet valve can be opened, and the associated outlet valve can be closed. To individually maintain pressure in an assigned wheel brake, the associated inlet valve and the associated outlet valve can be closed. To individually reduce pressure in an assigned wheel brake, the associated inlet valve can be closed, and the associated outlet valve can be opened.

In another advantageous embodiment of the operating method, when the main system fails, the first shut-off valve and the second shut-off valve can be transferred into the closed state, and the third shut-off valve and the fourth shut-off valve can be transferred into the open state, the drive of the second single-circuit pressure generator being controlled accordingly to increase pressure or to reduce pressure or to maintain pressure in the brake circuits.

In another advantageous embodiment of the operating method, when a leakage is detected in a brake circuit, the associated shut-off valve can be closed. In addition, when a leakage is detected in the at least two wheel brakes, the associated inlet valve can be closed.

Exemplary embodiments of the disclosure are shown in the drawings and are explained in greater detail in the following description. In the drawings, like reference signs denote components or elements which perform the same or analogous functions.

DETAILED DESCRIPTION

As can be seen from FIGS. 1 to 4, the exemplary embodiments shown of a multiple-circuit, hydraulically open brake system 1, 1A, 1B, 1C according to the disclosure, in particular for a highly automated or autonomous vehicle, comprise in each case at least two wheel brakes RB1, RB2, RB3, RB4, which are each assigned to a brake circuit BK1, BK2 having a pressure-relief path 9.1, 9.2, two single-circuit pressure generators 12, 22, which are hydraulically connected in parallel between at least one fluid container 17, 27 and the at least two wheel brakes RB1, RB2, RB3, RB4, and a modulation unit 16, 16A, 16B, 16C for the hydraulic connection of the single-circuit pressure generator 12, 22 to the at least two wheel brakes RB1, RB2, RB3, RB4 and for the individual brake pressure modulation in the at least two wheel brakes RB1, RB2, RB3, RB4. In this case, a first single-circuit pressure generator 12 is assigned to a main system 10, 10A, 10B, 10C which has a first energy supply EV1 and a first evaluation and control unit 14, and can be connected by a first shut-off valve V1 to at least one wheel brake RB1, RB2 of a first brake circuit BK1 and by a second shut-off valve V2 to at least one wheel brake RB3, RB4 of a second brake circuit BK2. A second single-circuit pressure generator 22 is assigned to a secondary system 20, 20A, 20B, 20C, which has a second energy supply EV2 which is independent of the first energy supply EV1, and a second evaluation and control unit 24, and can be connected by a third shut-off valve V3 to at least one wheel brake RB1, RB2 of the first brake circuit BK1 and by a fourth shut-off valve V4 to at least one wheel brake RB3, RB4 of the second brake circuit BK2. The second evaluation and control unit 24 controls the second single-circuit pressure generator 22, wherein components of the modulation unit 16, 16A, 16B, 16C for the individual brake pressure modulation are assigned to the main system 10, 10A, 10B, 10C so that said components of the modulation unit 16, 16A, 16B, 16C and the first single-circuit pressure generator 12 are controlled by the first evaluation and control unit 14 and supplied with energy by the first energy supply EV1.

The shut-off valves V1, V2, V3, V4 can be controlled by the first evaluation and control unit 14 and/or by the second evaluation and control unit 24 in such a way that, when one of the two single-circuit pressure generators 12, 22 is activated, a hydraulic fluid is not conducted by the other of the two single-circuit pressure generators 12, 22.

As can further be seen from FIGS. 1 to 4, the brake systems 1, 1A, 1B, 1C shown each comprise two brake circuits BK1, BK2 having in each case one pressure-relief path 9.1, 9.2 and four wheel brakes RB1, RB2, RB3, RB4, wherein a first wheel brake RB1 and a second wheel brake RB2 and a first pressure-relief path 9.1 are assigned to a first brake circuit BK1, and a third wheel brake RB3 and a fourth wheel brake RB4 and a second pressure-relief path 9.2 are assigned to a second brake circuit. In this case, an X-distribution of the wheel brakes RB1, RB2, RB3, RB4 to the two brake circuits BK1, BK2 is possible, that is to say that the first wheel brake RB1 is arranged on the left front wheel, and the second wheel brake RB2 is arranged on the right rear wheel, and the third wheel brake RB3 is arranged on the right front wheel, and the fourth wheel brake RB4 is arranged on the left rear wheel. Alternatively, an II-distribution of the wheel brakes RB1, RB2, RB3, RB4 to the two brake circuits BK1, BK2 is possible, that is to say that the first wheel brake RB1 is arranged on the left front wheel, and the second wheel brake RB2 is arranged on the right front wheel, and the third wheel brake RB3 is arranged on the left rear wheel, and the fourth wheel brake RB4 is arranged on the right rear wheel. In addition, a first fluid container 17 having at least one fluid chamber is assigned to the main system 10, 10A, 10B, 10C, and a second fluid container 27 having at least one fluid chamber is assigned to the secondary system 20, 20A, 20B, 20C. In addition, the two fluid containers 17, 27 can be combined to form a common fluid container 7.

Figure 1:
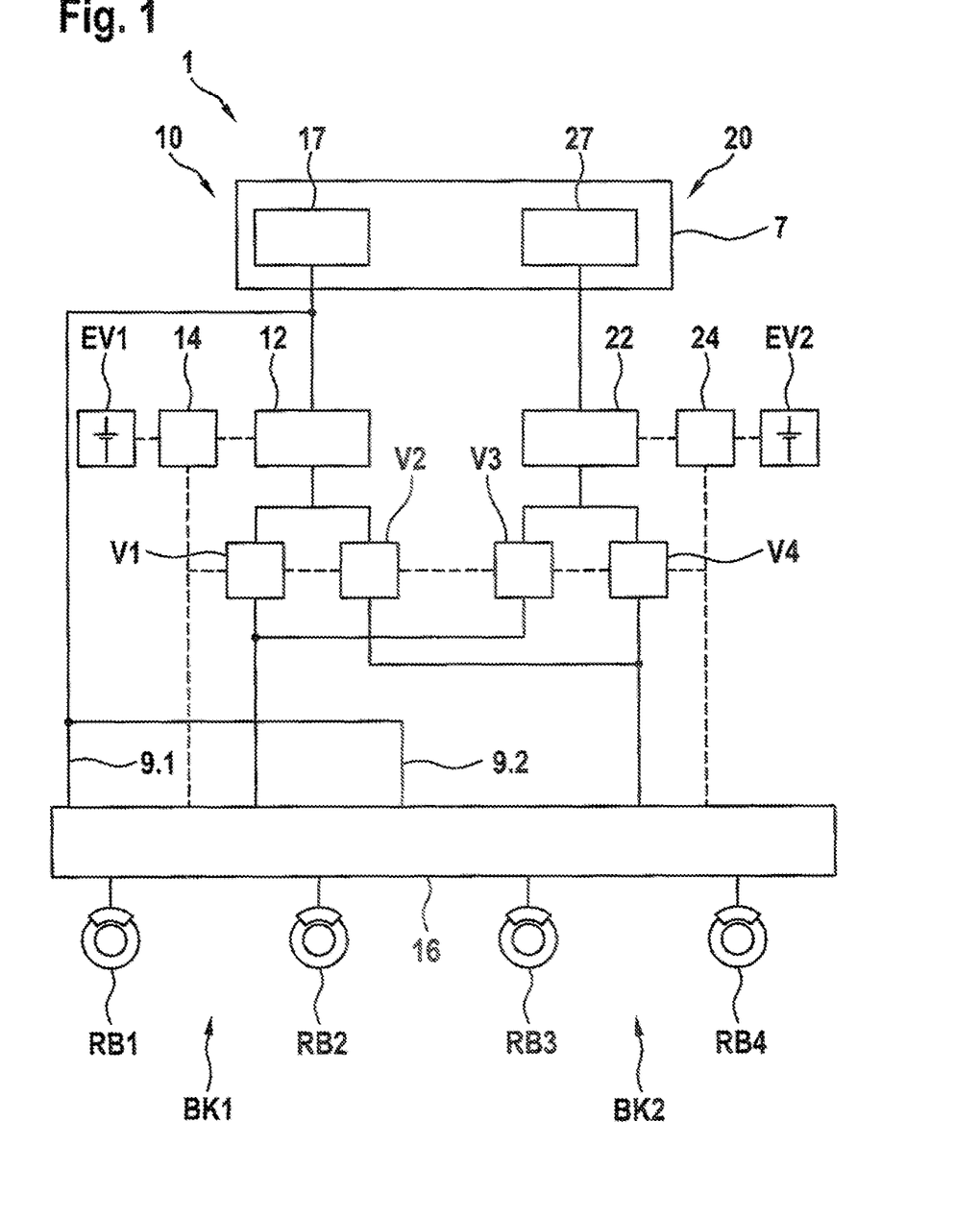
FIG. 1 is a schematic block diagram of an exemplary embodiment of a multiple-circuit, hydraulically open brake system according to the disclosure, in particular for a highly automated or autonomous vehicle.
Figure 2:
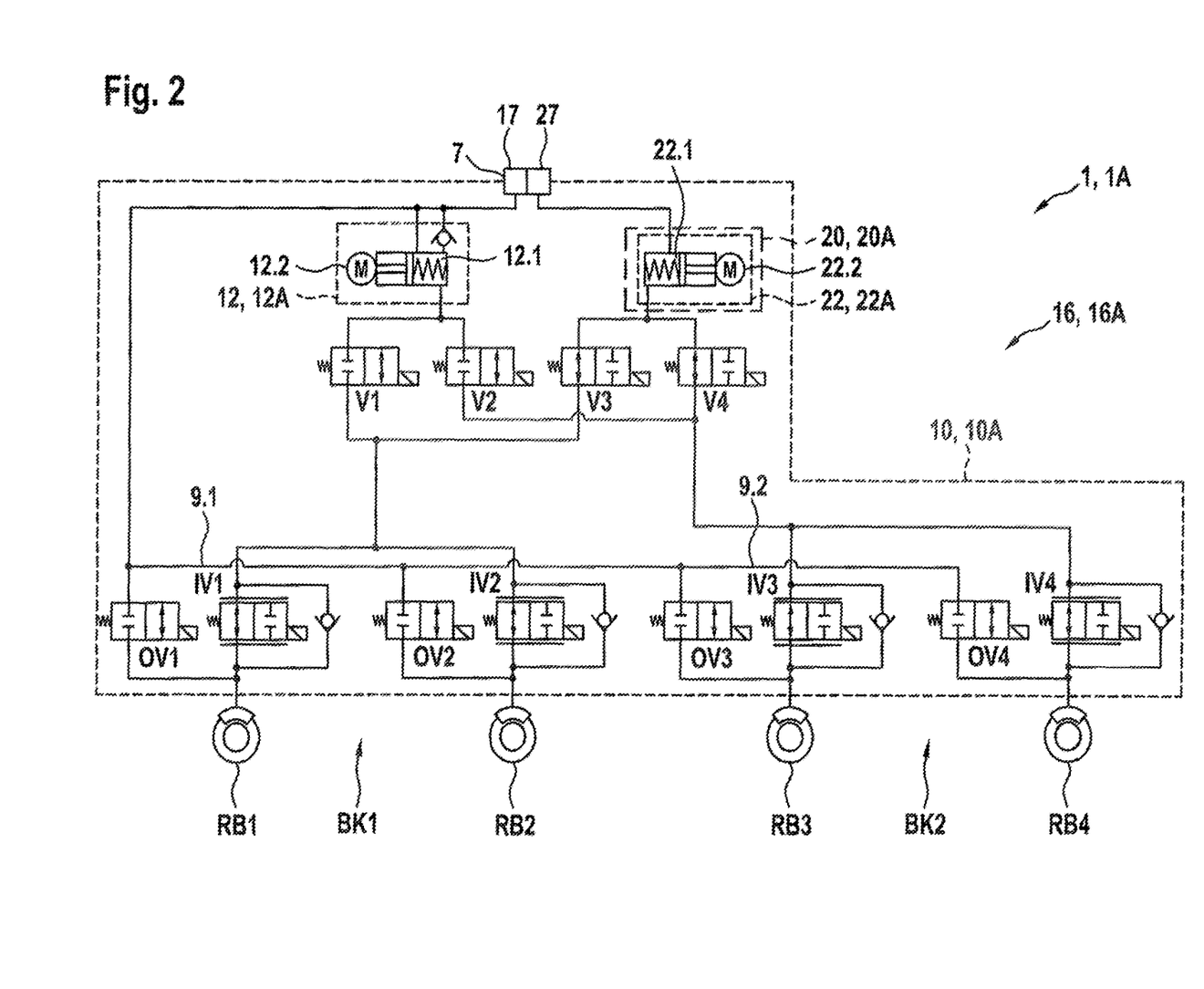
FIG. 2 is a schematic hydraulic circuit diagram of a first exemplary embodiment of a multiple-circuit, hydraulically open brake system according to the disclosure, in particular for a highly automated or autonomous vehicle.
Figure 3:
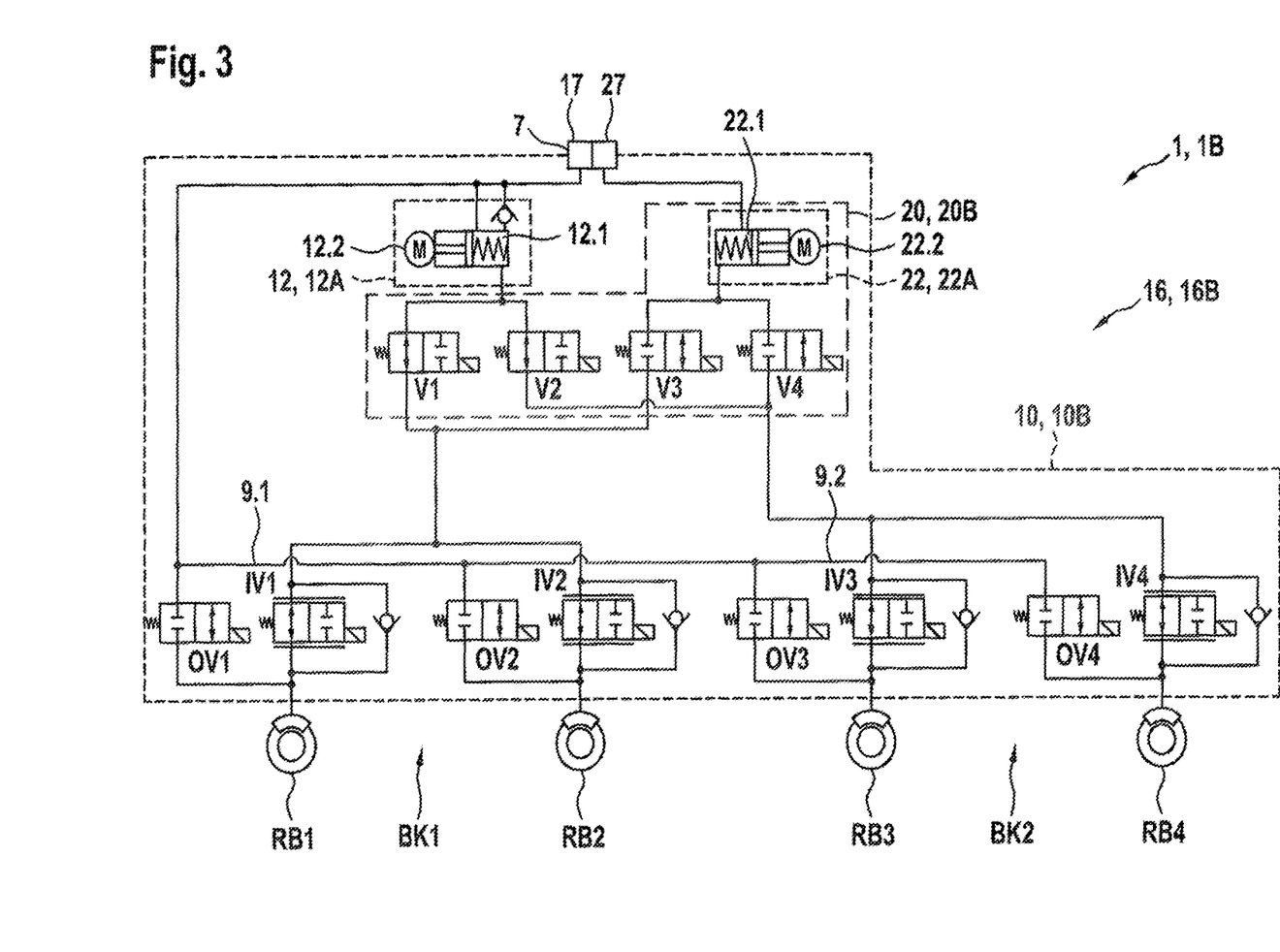
FIG. 3 is a schematic hydraulic circuit diagram of a second exemplary embodiment of a multiple-circuit, hydraulically open brake system according to the disclosure, in particular for a highly automated or autonomous vehicle.
Figure 4:
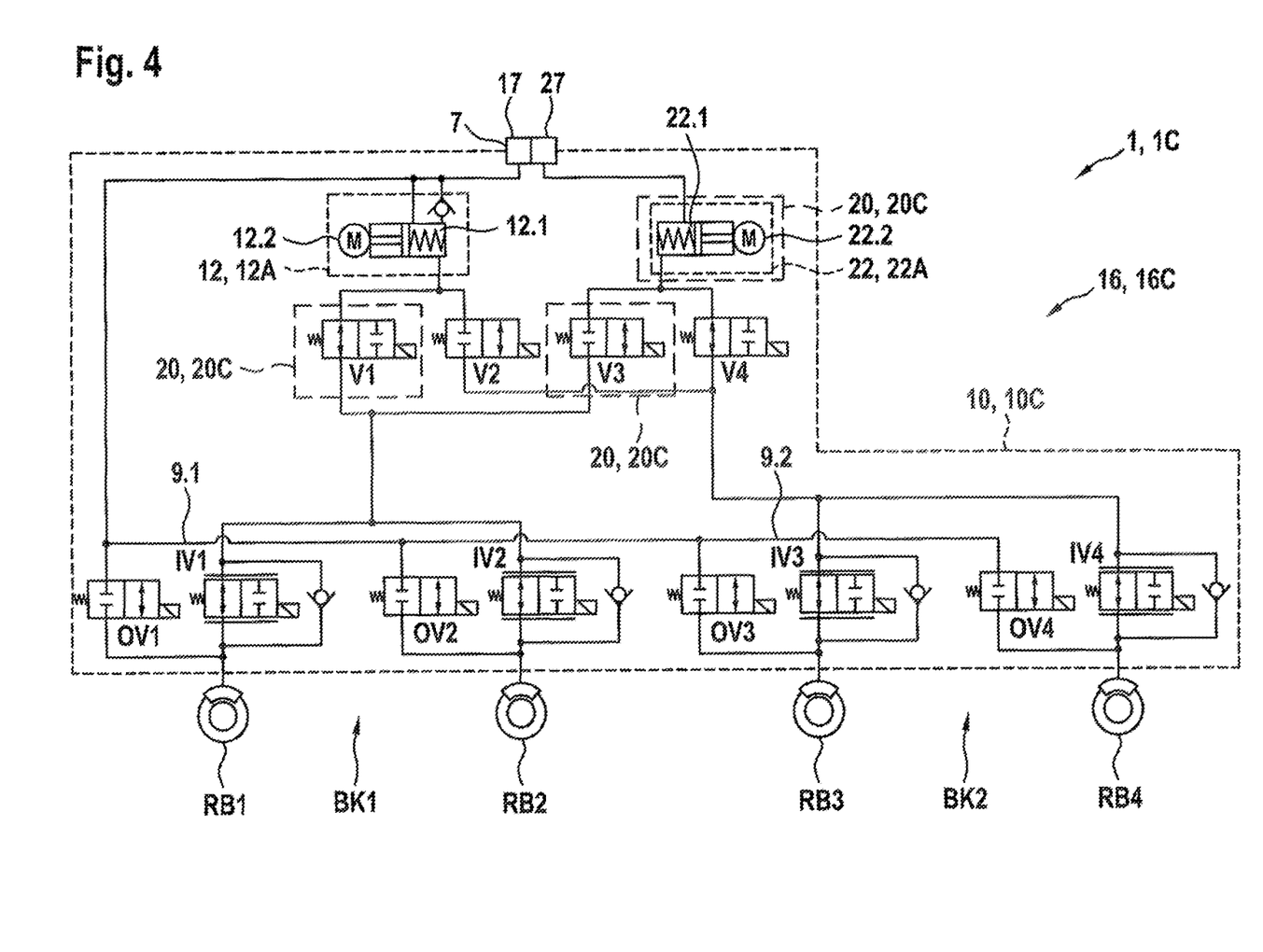
FIG. 4 is a schematic hydraulic circuit diagram of a third exemplary embodiment of a multiple-circuit, hydraulically open brake system according to the disclosure, in particular for a highly automated or autonomous vehicle.

As can further be seen from FIGS. 2 to 4, the first pressure generator 12 in the exemplary embodiments of the brake system 1, 1A, 1B, 1C shown is designed in each case as a plunger system 12A. In the exemplary embodiments of the brake system 1, 1A, 1B, 1C shown, the second pressure generator 22 is likewise designed in each case as a plunger system 22A. In alternative exemplary embodiments which are not shown, the two pressure generators 12, 22 or at least one of the two pressure generators 12, 22 can be designed as a pump system.

As can further be seen from FIGS. 2 to 4, the modulation unit 16, 16A, 16B, 16C, in the exemplary embodiments of the brake system 1, 1A, 1B, 1C, 1D shown, comprises, for each wheel brake RB1, RB2, RB3, RB4, in each case one inlet valve IV1, IV2, IV3, IV4 which are designed as adjustable magnetic valves which are open when de-energized, and in each case one outlet valve OV1, OV2, OV3, OV4 which are designed as switch valves which are closed when de-energized. Alternatively, the outlet valves OV1, OV2, OV3, OV4 can be designed as adjustable magnetic valves which are closed when de-energized. In this case, a first inlet valve IV1 and a first outlet valve OV1 are assigned to the first wheel brake RB1. A second inlet valve IV1 and a second outlet valve OV2 are assigned to the second wheel brake RB2. A third inlet valve IV3 and a third outlet valve OV3 are assigned to the third wheel brake RB3, and a fourth inlet valve IV4 and a fourth outlet valve OV4 are assigned to the fourth wheel brake RB4. In addition, during an individual brake pressure modulation in the at least one wheel brake RB1, RB2, RB3, RB4, brake fluid released via an assigned outlet valve OV1, OV2, OV3, OV4 from the at least one wheel brake RB1, RB2, RB3, RB4 is returned via the at least one pressure-relief path 9.1, 9.2 either to the first fluid container 17 or to the second fluid container 27. In the exemplary embodiments shown, the brake fluid or hydraulic fluid from the wheel brakes RB1, RB2, RB3, RB4 is returned to the first fluid container 17 which is assigned to the main system 10, 10A, 10B, 10C.

As can further be seen from FIGS. 2 to 4, in the exemplary embodiments shown, the first single-circuit pressure generator 12 comprises in each case one plunger system 12A having a piston-cylinder unit which has a piston and a chamber 12.1 and a drive 12.2. The drive 12.2 is designed as an electric motor and moves the piston against the force of a return spring for pressure adjustment in the chamber 12.1. In the exemplary embodiments shown, the second single-circuit pressure generator 22 comprises in each case one plunger system 22A having a piston-cylinder unit which has a piston and a chamber 22.1 and a drive 22.2. The drive 22.2 is designed as an electric motor and moves the piston against the force of a return spring for pressure adjustment in the chamber 22.1.

As can further be seen from FIGS. 2 to 4, in the exemplary embodiments shown, the first fluid container 17 is hydraulically connected in each case to the chamber 12.1 of the first plunger system 12A and the pressure-relief paths 9.1, 9.2. In addition, the chamber 12.1 of the first plunger system 12A is assigned to the first brake circuit BK1 and the second brake circuit BK2. In addition, in the exemplary embodiments shown, a suction line having a non-return valve is provided for the first pressure generator 12, which line additionally hydraulically connects the chamber 12.1 of the first plunger system 12A to the first fluid container 17. In the exemplary embodiments shown, the second fluid container 27 is hydraulically connected to the chamber 22.1 of the second plunger system 22A.

In addition, the chamber 22.1 of the second plunger system 22A is assigned to the first brake circuit BK1 and the second brake circuit BK2. The piston-cylinder units of the first and second plunger system 12A, 22A, when in the de-energized state, are designed to be able to be flowed through so that brake fluid can flow through the corresponding chambers 12.1, 22.1.

As can further be seen from FIGS. 2 to 4, the first pressure generator 12, the second pressure generator 22 and the modulation unit 16, in the exemplary embodiments shown, are arranged in a common hydraulic block in which the corresponding hydraulic connecting lines or connecting channels are also formed. In addition, the shut-off valves V1, V2, V3, V4 are also arranged in said common hydraulic block. In an alternative exemplary embodiment which is not shown, the first pressure generator 12 and the modulation unit 16 are arranged in a first hydraulic block, and the second pressure generator 22 is arranged in a second hydraulic block. In this alternative exemplary embodiment, the first fluid container 17 is connected to the first hydraulic block or integrated in the first hydraulic block, and the second fluid container 27 is connected to the second hydraulic block or integrated in the second hydraulic block.

As can further be seen from FIG. 2, in the first exemplary embodiment of the brake system 1A shown, the first shut-off valve V1 and the second shut-off valve V2 are each designed as magnetic valves which are closed when de-energized, and the third shut-off valve V3 and the fourth shut-off valve V4 are designed as magnetic valves which are open when de-energized, the first evaluation and control unit 14 controlling the shut-off valves V1, V2, V3, V4. Thus, in this embodiment, the shut-off valves V1, V2, V3, V4 belong to the main system 10A and are supplied with energy by the first energy supply unit EV1. By designing the first shut-off valve V1 and the second shut-off valve V1 to be closed when de-energized, the first pressure generator 12 is hydraulically separated from the wheel brakes RB1, RB2, RB3, RB4. By designing the third shut-off valve V3 and the fourth shut-off valve V4 to be open when de-energized, the second pressure generator 22 is hydraulically connected to the wheel brakes RB1, RB2, RB3, RB4. Therefore, in normal operation in which the first single-circuit pressure generator 12 generates the pressure for the wheel brakes RB1, RB2, RB3, RB4, control of the shut-off valves V1, V2, V3, V4 is required to hydraulically connect the first single-circuit pressure generator 12 to the wheel brakes RB1, RB2, RB3, RB4 and to hydraulically separate the second pressure generator 22 from the wheel brakes RB1, RB2, RB3, RB4. In addition, the wheel brakes RB1, RB2, RB3, RB4 are connected to the second fluid container 27 by means of the second single-circuit pressure generator 22 in order to be able to compensate for a temperature-dependent expansion of the brake fluid in the de-energized or passive state by what is known as "respiration". Therefore, in this context, "respiration by the secondary system 20A" is mentioned.

As can further be seen from FIG. 3, in the second exemplary embodiment of the brake system 1B shown, the first shut-off valve V1 and the second shut-off valve V2 are each designed as magnetic valves which are open when de-energized, and the third shut-off valve V3 and the fourth shut-off valve V4 are designed as magnetic valves which are closed when de-energized, the second evaluation and control unit 14 controlling the shut-off valves V1, V2, V3, V4. Thus, in this embodiment, the shut-off valves V1, V2, V3, V4 belong to the secondary system 20B and are supplied with energy by the second energy supply unit EV2. By designing the first shut-off valve V1 and the second shut-off valve V1 to be open when de-energized, the first single-circuit pressure generator 12 is hydraulically connected to the wheel brakes RB1, RB2, RB3, RB4. By designing the third shut-off valve V3 and the fourth shut-off valve V4 to be closed when de-energized, the second single-circuit pressure generator 22 is hydraulically separated from the wheel brakes RB1, RB2, RB3, RB4. Therefore, in normal operation in which the first single-circuit pressure generator 12 generates the pressure for the wheel brakes RB1, RB2, RB3, RB4, control of the shut-off valves V1, V2, V3, V4 is not required to hydraulically connect the first single-circuit pressure generator 12 to the wheel brakes RB1, RB2, RB3, RB4 and to hydraulically separate the second single-circuit pressure generator 22 from the wheel brakes RB1, RB2, RB3, RB4. In addition, the wheel brakes RB1, RB2, RB3, RB4 are connected to the first fluid container 17 by means of the first single-circuit pressure generator 22 in order to be able to compensate for a temperature-dependent expansion of the brake fluid in the de-energized or passive state by what is known as "respiration". Therefore, in this context, "respiration by the main system 10B" is mentioned.

As can further be seen from FIG. 4, in the third exemplary embodiment of the brake system 1C shown, the first shut-off valve V1 and the fourth shut-off valve V4 are each designed as magnetic valves which are open when de-energized, and the second shut-off valve V2 and the third shut-off valve V3 are designed as magnetic valves which are closed when de-energized, the first evaluation and control unit 14 controlling the second shut-off valve V2 and the fourth shut-off valve V4, and the second evaluation and control unit 24 controlling the first shut-off valve V1 and the third shut-off valve V3. Thus, in this embodiment, the second shut-off valve V2 and the fourth shut-off valve V4 belong to the main system 10C and are supplied with energy by the first energy supply unit EV1. In this embodiment, the first shut-off valve V1 and the third shut-off valve V3 belong to the secondary system 20C and are supplied with energy by the second energy supply unit EV2. By designing the first shut-off valve V1 to be open when de-energized, the first single-circuit pressure generator 12 is hydraulically connected to the wheel brakes RB1, RB2 of the first brake circuit BK1. By designing the second shut-off valve V2 to be closed when de-energized, the first single-circuit pressure generator 12 is hydraulically separated from the wheel brakes RB3, RB4 of the second brake circuit BK2. By designing the fourth shut-off valve V4 to be open when de-energized, the second single-circuit pressure generator 22 is hydraulically connected to the wheel brakes RB3, RB4 of the second brake circuit BK2. By designing the third shut-off valve V3 to be closed when de-energized, the second single-circuit pressure generator 22 is hydraulically separated from the wheel brakes RB1, RB2 of the first brake circuit BK1. Therefore, in normal operation in which the first pressure generator 12 generates the pressure for the wheel brakes RB1, RB2, RB3, RB4, control of the second shut-off valve V3 is required to also hydraulically connect the first pressure generator 12 to the wheel brakes RB3, RB4 of the second brake circuit BK2, and control of the fourth shut-off valve V4 is required to also hydraulically separate the second pressure generator 22 from the wheel brakes RB3, RB4 of the second brake circuit BK2. In addition, the wheel brakes RB1, RB2 of the first brake circuit BK1 are connected to the at least one fluid container 17, 27 by means of the first single-circuit pressure generator 12, and the wheel brakes RB3, RB4 of the second brake circuit BK2 are connected to the at least one fluid container 17, 27 by means of the second single-circuit pressure generator 22 in order to be able to compensate for a temperature-dependent expansion of the brake fluid in the de-energized or passive state by what is known as "respiration". Therefore, in this context, "respiration by the main system 10C and by the secondary system 20C" is mentioned.

In the case of the operating method according to the disclosure for the above-described multiple-circuit, hydraulically open brake system 1, 1A, 1B, 1C, in particular for a highly automated or autonomous vehicle, in normal operation, the main system 10, 10A, 10B, 10C, by means of the first single-circuit pressure generator 12, increases or reduces or maintains the pressure in the brake circuits BK1, BK2 and, by means of the modulation unit 16, 16A, 16B, 16C, carries out the individual brake pressure modulation in the at least two wheel brakes RB1, RB2, RB3, RB4. When the main system 10, 10A, 10B, 10C fails, by means of the second single-circuit pressure generator 22, the secondary system 20, 20A, 20B, 20C increases or reduces or maintains the pressure in the brake circuits BK1, BK2, and the individual brake pressure modulation is omitted in the at least two wheel brakes RB1, RB2, RB3, RB4.

In normal operation, the first shut-off valve V1 and the second shut-off valve V2 are transferred into the open state, and the third shut-off valve V3 and the fourth shut-off valve V4 are transferred into the closed state. To increase pressure or reduce pressure or maintain pressure in the brake circuits BK1, BK2, the drive 12.2 of the first single-circuit pressure generator 12 is controlled accordingly.

In addition, in normal operation, to individually increase pressure in an assigned wheel brake RB1, RB2, RB3, RB4, the associated inlet valve IV1, IV2, IV3, IV4 is opened, and the associated outlet valve OV1, OV2, OV3, OV4 is closed. To individually maintain pressure in an assigned wheel brake RB1, RB2, RB3, RB4, the associated inlet valve IV1, IV2, IV3, IV4 and the associated outlet valve OV1, OV2, OV3, OV4 are closed. In addition, in normal operation, to individually reduce pressure in an assigned wheel brake RB1, RB2, RB3, RB4, the associated inlet valve IV1, W2, IV3, W4 is closed, and the associated outlet valve OV1, OV2, OV3, OV4 is opened.

When the main system 10, 10A, 10B, 10C fails, the first shut-off valve V1 and the second shut-off valve V2 are transferred into the closed state, and the third shut-off valve V3 and the fourth shut-off valve V4 are transferred into the open state, the drive 22.2 of the second pressure generator 22 being controlled accordingly to increase pressure or to reduce pressure or to maintain pressure in the brake circuits BK1, BK2.

In addition, when a leakage is detected in a brake circuit BK1, BK2, the associated shut-off valve V1, V2 is closed. When a leakage is detected in one of the wheel brakes RB1, RB2, RB3, RB4, the associated inlet valve IV1, IV2, IV3, IV4 is closed.

This method can be implemented for example in software or hardware or in a hybrid of software and hardware, for example in a control device.

Embodiments of the present disclosure provide a multiple-circuit, hydraulically open brake system without mechanical and/or hydraulic intervention by the driver, in particular for a highly automated or autonomous vehicle, and a corresponding operating method, the single-circuit pressure generator used, which is hydraulically connected in parallel, acting on all the wheel brakes by means of the hydraulic connection via the modulation unit.

The invention claimed is:

1. A multiple-circuit, hydraulically open brake system, comprising:
    at least two wheel brakes, which are each assigned to a respective brake circuit having a pressure-relief path;
    a first single-circuit pressure generator;
    a second single-circuit pressure generator, the first and second single-circuit pressure generators being hydraulically connected in parallel between at least one fluid container and the at least two wheel brakes; and
    a modulation unit configured to modulate respective hydraulic connections between the first and second single-circuit pressure generators to the at least two wheel brakes and for individual brake pressure modulation in the at least two wheel brakes,
    wherein the first single-circuit pressure generator is assigned to a main system which has a first energy supply, a first evaluation and control unit, a first shut-off valve, and a second shut-off valve, the first shut-off valve configured to connect the first single-circuit pressure generator to at least one first wheel brake of the at least two wheel brakes assigned to a first respective brake circuit, and the second shut-off valve configured to connect the first single-circuit pressure generator to at least one second wheel brake of a second respective brake circuit,
    wherein the second single-circuit pressure generator is assigned to a secondary system, which has a second energy supply which is independent of the first energy supply, a second evaluation and control unit, a third shut-off valve, and a fourth shut-off valve, the third shut-off valve configured to connect the second single-circuit pressure generator to the at least one first wheel brake of the first brake circuit, and the fourth shut-off valve configured to connect the second single-circuit pressure generator to the at least one second wheel brake of the second brake circuit,
    wherein the second evaluation and control unit controls the second single-circuit pressure generator,
    wherein components of the modulation unit are assigned to the main system so that said components of the modulation unit and the first single-circuit pressure generator are controlled by the first evaluation and control unit and supplied with energy by the first energy supply,
    wherein in normal operation:
        the first evaluation and control unit is configured to control the first single-circuit pressure generator of the main system to increase, reduce, or maintain the pressure in the first and the second brake circuits;
        the first evaluation and control unit is configured to control the first, second, third, and fourth shut-off valves; and
        the modulation unit is configured to perform the individual brake pressure modulation in the at least two wheel brakes, and
    wherein when the main system fails:
        the second evaluation and control unit is configured to control the second single-circuit pressure generator of the secondary system to increase, reduce, or maintain the pressure in the first and the second brake circuits; and
        the second evaluation and control unit is further configured to control the modulation unit to omit the individual brake pressure modulation in the at least two wheel brakes.

2. The brake system according to claim 1, wherein at least one of the first and second evaluation and control units is configured to control the first, second, third, and fourth shut-off valves such that, when the second single-circuit pressure generator is activated, a hydraulic fluid is not conducted through the first single-circuit pressure generator.

3. The brake system according to claim 2, wherein:
    the first and second shut-off valves are each configured as magnetic valves that are closed when de-energized, and
    the third and fourth shut-off valves are each configured as magnetic valves which are open when de-energized.

4. The brake system according to claim 2, wherein:
    the first and second shut-off valves are each configured as magnetic valves which are open when de-energized,
    the third and fourth shut-off valves are each configured as magnetic valves which are closed when de-energized, and
    the second evaluation and control unit controls the first, second, third, and fourth shut-off valves.

5. The brake system according to claim 2, wherein:
    the first and fourth shut-off valves are each configured as magnetic valves which are open when de-energized,
    the second and third shut-off valves are each configured as magnetic valves which are closed when de-energized,
    the first evaluation and control unit controls the second and fourth shut-off valves, and
    the second evaluation and control unit controls the first and third shut-off valves.

6. The brake system according to claim 1, wherein:
the at least one fluid container includes a common fluid container shared by the main system and the secondary system, or
the at least one fluid container includes a first fluid container having at least one fluid chamber assigned to the main system and a second fluid container having at least one fluid chamber is assigned to the secondary system.

7. The brake system according to claim 6, further comprising:
at least one suction line having a non-return valve that hydraulically connects the first single-circuit pressure generator to the first fluid container.

8. The brake system according to claim 6, wherein, during an individual brake pressure modulation in the at least one wheel brake, brake fluid released from the at least one wheel brake is returned via the at least one pressure-relief path either to the first fluid container or to the second fluid container.

9. The brake system according to claim 1, wherein the second single-circuit pressure generator is configured as one of a plunger system and a pump system.

10. The brake system according to claim 1, wherein at least one of the first and second single-circuit pressure generators is configured as a plunger system comprising:
a piston-cylinder unit having a piston and a chamber; and
a drive configured to move the piston against the force of a return spring for pressure adjustment in the chamber.

11. The brake system according to claim 1, wherein at least one of the first and second single-circuit pressure generators is configured as a pump system comprising a pump and a drive that drives the pump.

12. The brake system according to claim 1, further comprising a common hydraulic block in which the first pressure generator, the second pressure generator, and the modulation unit are arranged.

13. The brake system according to claim 1, further comprising:
a first hydraulic block in which the first pressure generator and the modulation unit are arranged; and
a second hydraulic block in which the second pressure generator is arranged.

14. The brake system according to claim 1, wherein:
the brake system is included in an autonomous vehicle or a highly automated vehicle,
the first evaluation and control unit and the second evaluation and control unit are electronically controlled to cause the at least two wheel brakes to generate a desired braking pressure without mechanical or hydraulic intervention by a driver of the vehicle, and
the brake system omits a pedal travel simulator and mechanisms for generating driver pressure for operating the at least two wheel brakes.

15. A method for operating a multiple-circuit, hydraulically open brake system in a vehicle, the method comprising:
in normal operation:
operating a main system to increase, reduce, or maintain pressure in a plurality of brake circuits via a first single-circuit pressure generator;
performing individual brake pressure modulation in at least two wheel brakes with a modulation unit;
controlling a first shut-off valve and a second shut-off valve of the main system with a first evaluation and control unit of the main system;
controlling a third shut-off valve and a fourth shut-off valve of a secondary system with the first evaluation and control unit; and
when the main system fails:
operating a second evaluation and control unit of the secondary system to increase, reduce, or maintain the pressure in the plurality of brake circuits via a second single-circuit pressure generator; and
omitting the individual brake pressure modulation in the at least two wheel brakes,
operating the brake system, in normal operation and when the main system fails, to generate braking pressure for stopping the vehicle without mechanical and/or hydraulic intervention from a driver of the vehicle,
wherein the brake system includes (i) the at least two wheel brakes, which are each assigned to a respective brake circuit of the plurality of brake circuits, each brake circuit having a pressure-relief path, (ii) the first single-circuit pressure generator, (iii) the second single-circuit pressure generator, the first and second single-circuit pressure generators hydraulically connected in parallel between at least one fluid container and the at least two wheel brakes; and (iv) the modulation unit modulating respective hydraulic connections between the first and second single-circuit pressure generators to the at least two wheel brakes and for the individual brake pressure modulation in the at least two wheel brakes,
wherein the first single-circuit pressure generator is assigned to the main system which has a first energy supply, the first evaluation and control unit, the first shut-off valve, and the second shut-off valve,
wherein the first shut-off valve connects the first single-circuit pressure generator to at least one first wheel brake of the at least two wheel brakes assigned to a first respective brake circuit,
wherein the second shut-off valve connects the first single-circuit pressure generator to at least one second wheel brake of a second respective brake circuit,
wherein the second single-circuit pressure generator is assigned to the secondary system, which has a second energy supply which is independent of the first energy supply, the second evaluation and control unit, the third shut-off valve, and the fourth shut-off valve,
wherein the third shut-off valve connects the second single-circuit pressure generator to the at least one first wheel brake of the first brake circuit,
wherein the fourth shut-off valve connects the second single-circuit pressure generator to the at least one second wheel brake of the second brake circuit,
wherein the second evaluation and control unit controls the second single-circuit pressure generator,
wherein components of the modulation unit are assigned to the main system so that the components of the modulation unit and the first single-circuit pressure generator are controlled by the first evaluation and control unit and supplied with energy by the first energy supply.

16. The method according to claim 15 further comprising, in normal operation:
operating the first shut-off valve and the second shut-off valve into an open state;
operating the third shut-off valve and the fourth shut-off valve into a closed state; and
controlling a drive of the first single-circuit pressure generator to increase, reduce, or maintain pressure in the brake circuits.

17. The method according to claim 15, the performing of the individual pressure modulation, in normal operation, further comprising:
- to increase pressure in an assigned wheel brake of the at least two wheel brakes, opening an inlet valve associated with the assigned wheel brake and closing an outlet valve associated with the assigned wheel brake;
- to maintain pressure in the assigned wheel brake, closing the inlet valve and the outlet valve; and
- to reduce pressure in the assigned wheel brake, opening the outlet valve.

18. The method according to claim 15, further comprising, when the main system fails:
- transferring the first shut-off valve and the second shut-off valve into a closed state;
- operating the third shut-off valve and the fourth shut-off valve into an open state; and
- controlling the drive of the second single-circuit pressure generator being controlled accordingly to increase pressure or to reduce pressure or to maintain pressure in the brake circuits.

19. The method according to claim 15, further comprising:
- when a leakage is detected in one of the brake circuits, closing one of the first, second, third, and fourth shut-off valves that is associated with the one brake circuit in which the leakage is detected.

20. The method according to claim 15, further comprising:
- when a leakage is detected in one of the at least two wheel brakes, closing an inlet valve associated with the one of the at least two wheel brakes in which the leakage is detected.

* * * * *